Aug. 13, 1963

H. J. BUTLER 3,100,553

DISC BRAKES FOR VEHICLES

Filed March 2, 1961

Inventor
Henry James Butler
by Benj. T. Rauber
his attorney

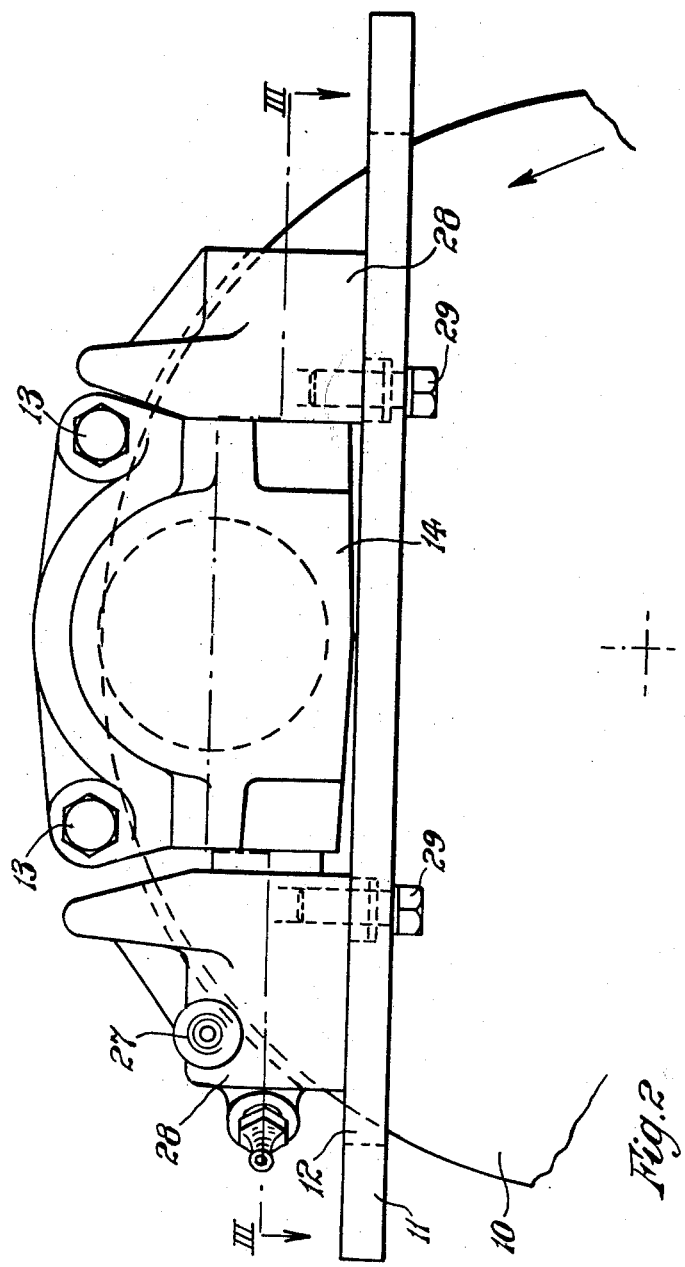

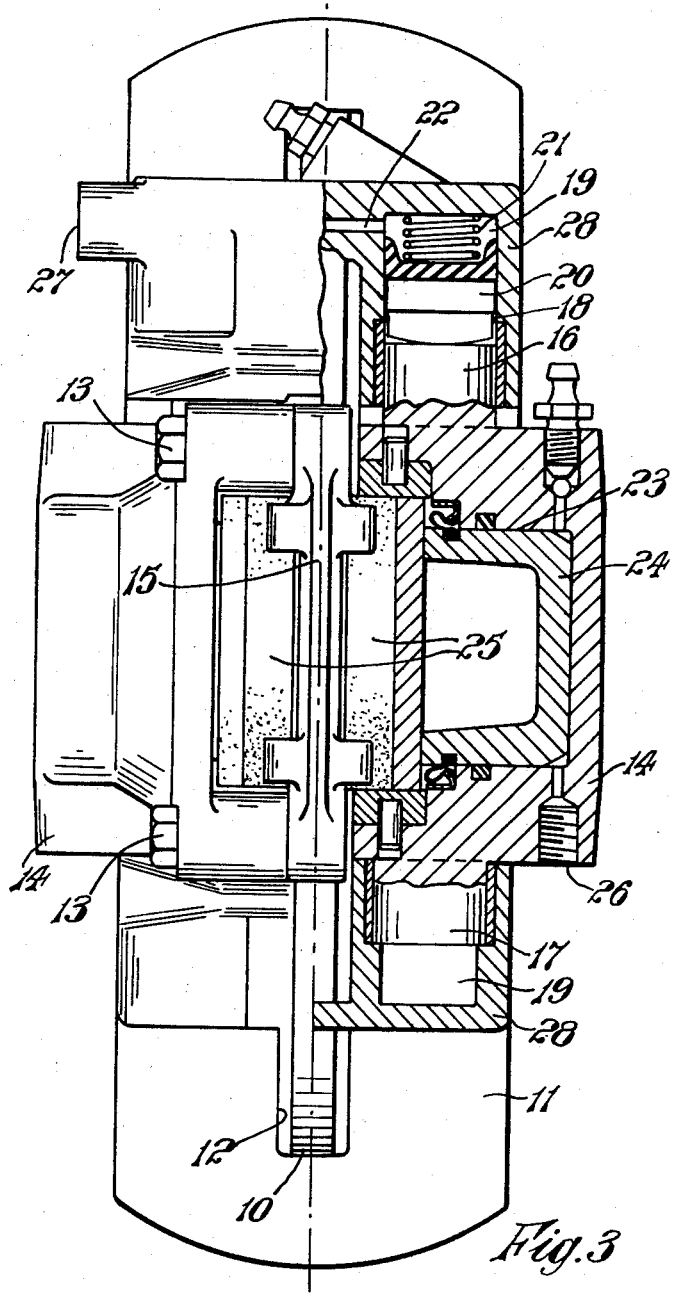

Aug. 13, 1963 H. J. BUTLER 3,100,553
DISC BRAKES FOR VEHICLES
Filed March 2, 1961 5 Sheets-Sheet 4

Inventor
Henry James Butler
by Benj. T. Rauber
his attorney

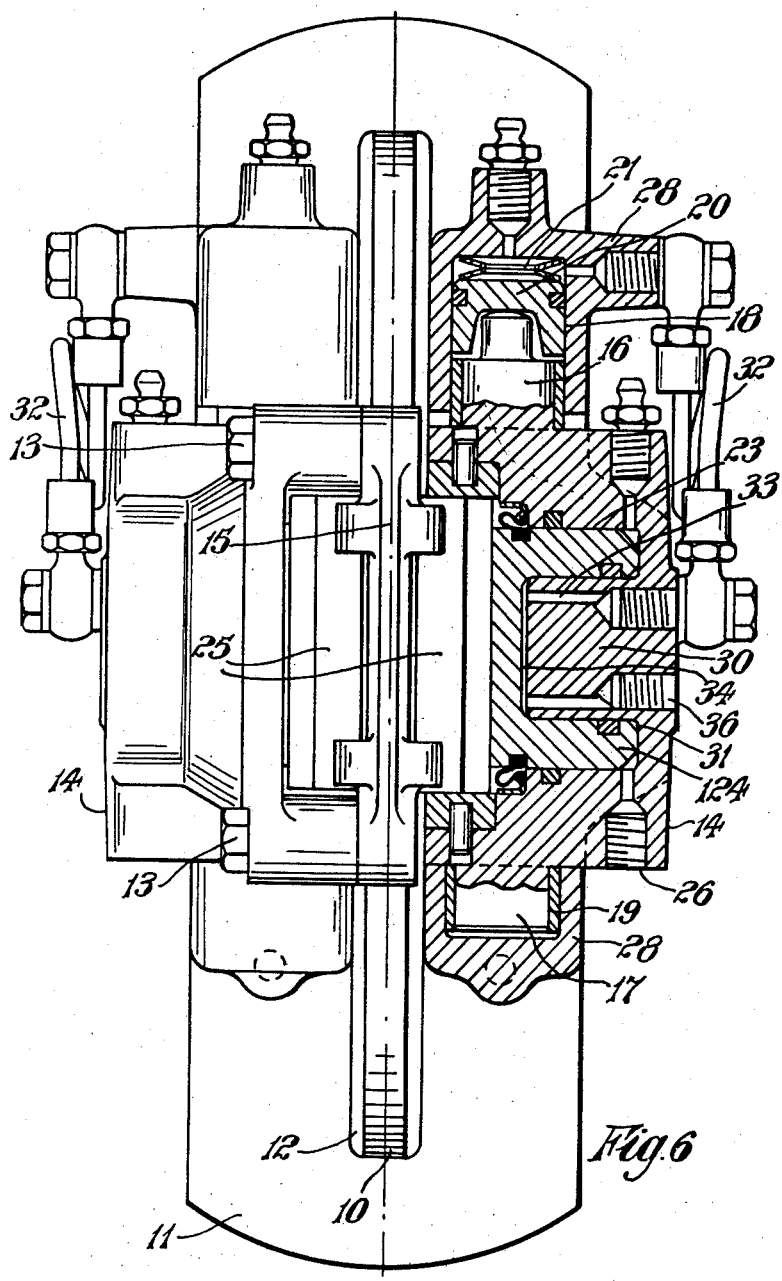

United States Patent Office 3,100,553
Patented Aug. 13, 1963

3,100,553
DISC BRAKES FOR VEHICLES
Henry James Butler, Sutton Coldfield, England, assignor to Dunlop Rubber Company Limited, a British company
Filed Mar. 2, 1961, Ser. No. 92,880
Claims priority, application Great Britain Mar. 5, 1960
6 Claims. (Cl. 188—73)

This invention provides a disc brake for a vehicle which includes a part movable under the influence of the torque reaction occurring when the brake is applied to effect servo application of the same or another brake of the vehicle. Due to this servo action, the effect required from the driver to apply the brakes can be considerably reduced.

This invention includes a disc brake for a wheeled vehicle comprising a rotatable disc, a non-rotatable slotted base member such as a slotted plate embracing the disc on a chord thereof, housings mounted on the base member on opposite sides of the disc for movement in a direction parallel to the braking surfaces of said disc, an operating cylinder in each housing containing a piston arranged, on admission of fluid under pressure to said cylinder, to apply a friction pad to the disc, spring means for resisting movement of the housings and plungers operable by sliding movement of the housings under the torque reaction between the disc and the pads to displace liquid to effect servo application of the same or another brake.

Two alternative embodiments of disc brake according to the invention will now be described in more detail, by way of example, with reference to the accompanying drawings, in which:

FIGURE 2 is a corresponding side elevation,

FIGURE 3 is a plan view, partly in section on the line III—III in FIGURE 2,

FIGURE 6 is a plan view, partly in section on the line VI—VI in FIGURE 5.

Like reference numerals indicate like parts throughout the figures.

Figure 1:
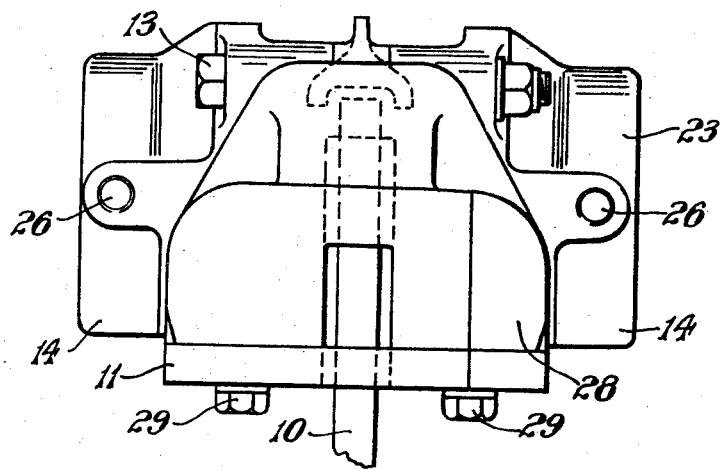
FIGURE 1 is an end elevation of the first form of disc brake.

The brake shown in FIGURES 1–3 includes a braking disc 10 attached to one of the front wheels (not shown) of the vehicle, and a base plate 11 forming a base member which is fixed to the vehicle and has a slot 12 embracing a chord of the disc 10. Mounted to slide longitudinally on the base plate 11 are two opposed housings 14, located on opposite sides of the disc 10, which are secured by bolts 13 to a bracing member 15 located outside the periphery of the disc 10. Each housing has at its ends plungers 16, 17 which slide in servo cylinders 18 and recesses 19 in end blocks 28 secured by bolts 29 to the base plate 11. A plunger 20, loaded by a spring 21, engages each of the spigots 16 and normally holds the housings 14 in the position shown in FIGURE 3. The servo cylinders 18 are filled with liquid from their closed end to the sealing ring on said plunger 20 and communicate via a passage 22. In each housing 14 is an operating cylinder 23, containing a piston 24 carrying a friction pad 25.

When fluid under pressure is admitted to inlets 26, the pistons 24 are moved to press the friction pads 25 against opposite sides of the disc 10. The resulting torque reaction between the disc 10 and the pads 25 moves the housings 14 along the base plate 11 against the action of the springs 21. The resultant movement of the plungers 20 forces the liquid in the servo cylinders 18 out of an outlet 27 to effect servo application of disc brakes associated with the rear wheels of the vehicle. When the brake is released, the springs 21 return the housings 14 to the position shown in FIGURE 3.

Figure 4:
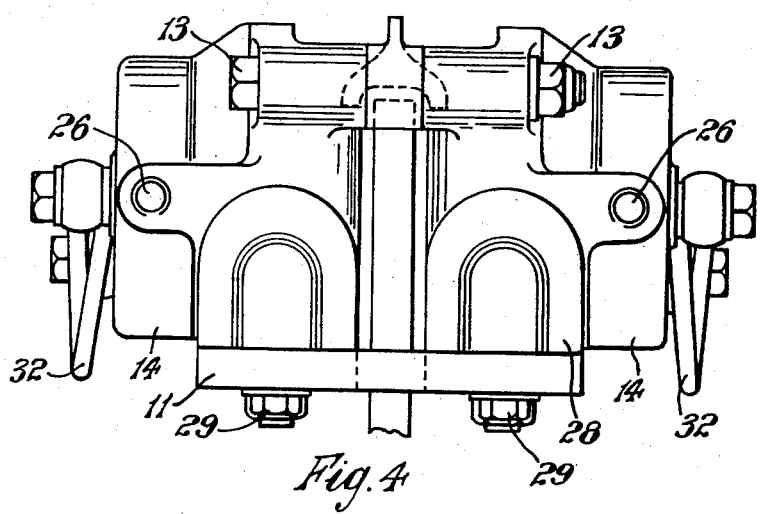
FIGURE 4 is an end elevation of the second form of disc brake.
Figure 5:
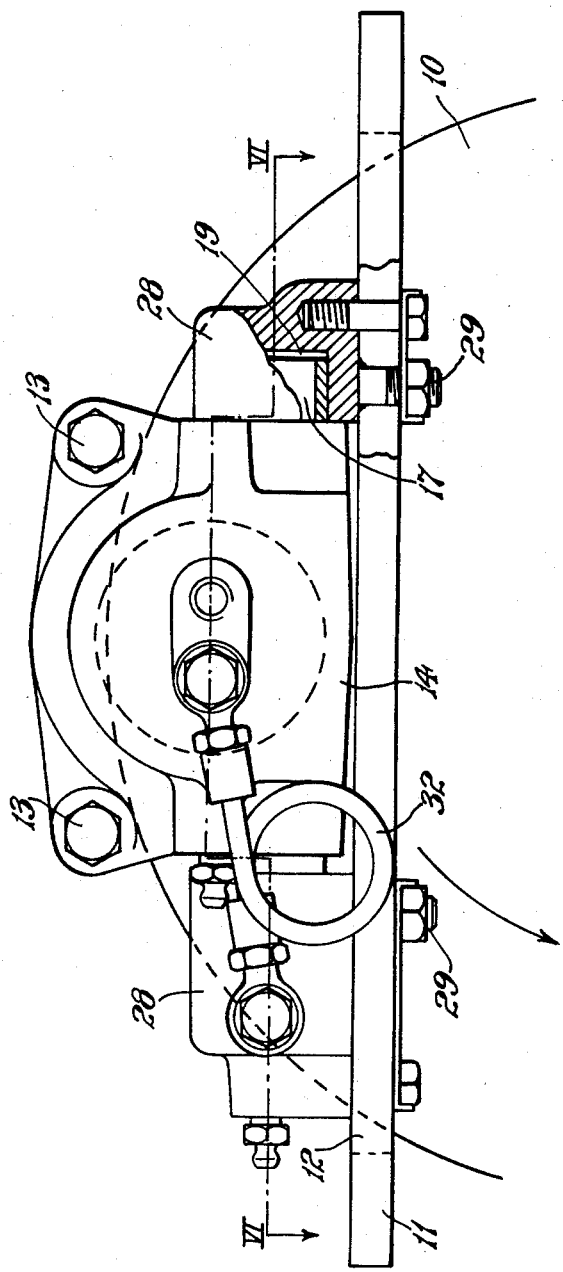
FIGURE 5 is a corresponding side elevation.

The disc brake shown in FIGURES 4–6 is of generally similar construction to that just described, but in this case the brake has a built-in servo action and movement of the housings 14 under the torque reaction augments the effect of fluid pressure on the brake and is not utilized to apply another brake. As shown, each of the pistons 124 is of cup shape and slides on a fixed boss 30. The primary fluid pressure for braking is applied from the inlets 26 to the annular areas 31 of the pistons 124 outside the bosses 30, while the servo braking pressure arising from longitudinal movement of the housings 14 is applied from the servo cylinders 18 through pipes 32 and ducts 33 in the bosses 30 to the central areas 34 of the pistons. While in this case primary braking pressure must be applied to all the brakes of the vehicle, the braking effort is also reduced as the braking pressure of each brake is augmented by the servo pressure developed as the result of torque reaction.

As will be appreciated, the construction just described may be varied by arranging for the primary braking pressure to be applied to the ducts 33 in the bosses and the servo braking pressure to the annular areas 31 of the pistons outside the bosses.

As indicated in FIGURE 6, each boss 30 has a secondary recuperation inlet 36.

Having now described my invention, what I claim is:

1. A disc brake comprising a rotatable disc, a non-rotatable slotted base member embracing said disc on a chord thereof, housings slidably mounted on said base member, one on each side of said disc, to slide on said base member parallel with said disc, friction pads, one between each said housing and the adjacent side of said disc, fluid operated means in each said housing to move said friction pads into frictional engagement with said disc thereby to slide said housings on said base member by the frictional drag of said rotating disc, and means actuated by said sliding housings to pressurize a brake fluid when said housings are displaced by said drag of said disc.

2. The disc brake of claim 1 in which said fluid operated means comprises a piston and cylinder in said housings.

3. The disc brake of claim 2 in which said means to pressurize the brake fluid comprises a container for each housing fixed on said base member and a plunger on said housing displaceable by the movement of said housing into said container.

4. The disc brake of claim 3 in which said piston has a central recess extending inwardly from the end away from its friction pad and in which said cylinder has a boss extending into said recess and sealed fluid tightly from said recess and in which said brake comprises a conduit from said container to said boss and said boss has a passage from said conduit to said recess.

5. The disc brake of claim 3 having means to return said housing to a central position when said friction pad is released from frictional engagement with said disc.

6. A disc brake comprising a rotatable disc, housings, one on each side of said disc, friction pads, one between each said housing and the adjacent side of said disc, fluid operated means in each said housing to move said friction pads into frictional engagement with said disc, means on each side of said disc to support said housings slidably to move under the frictional drag of said rotating disc chordwise of said disc, and means actuated by said sliding housings to pressurize a brake fluid when said housings are displaced by said drag of said disc.

References Cited in the file of this patent

UNITED STATES PATENTS

| | | |
|---|---|---|
| 2,419,113 | Bricker | Apr. 15, 1947 |
| 2,494,319 | Swain | Jan. 10, 1950 |
| 2,596,556 | Hollerith | May 13, 1952 |
| 2,957,553 | Chouings et al. | Oct. 25, 1960 |
| 2,976,956 | Behles | Mar. 28, 1961 |

FOREIGN PATENTS

| | | |
|---|---|---|
| 757,739 | Great Britain | Sept. 26, 1956 |